United States Patent [19]
Merl et al.

[11] Patent Number: 5,951,619
[45] Date of Patent: Sep. 14, 1999

[54] METHOD AND DEVICE FOR CONTROLLING AN ACTUATOR

[75] Inventors: Richard Merl, Schwandorf; Günther Raab, Regensburg, both of Germany

[73] Assignee: Siemens Aktiengesellschaft, Munich, Germany

[21] Appl. No.: 08/826,239

[22] Filed: Mar. 27, 1997

Related U.S. Application Data

[63] Continuation of application No. PCT/DE96/01314, Jul. 18, 1996.

[51] Int. Cl.$^6$ ............................................. G06F 9/46
[52] U.S. Cl. ............................................. 701/115; 701/102
[58] Field of Search ................................... 701/115, 114, 701/102; 123/478, 480, 486

[56] References Cited

U.S. PATENT DOCUMENTS

| | | | |
|---|---|---|---|
| 4,282,573 | 8/1981 | Imai et al. ............................ | 123/480 |
| 4,310,888 | 1/1982 | Furuhashi et al. . | |
| 4,482,962 | 11/1984 | Amano et al. ........................ | 701/114 |
| 4,703,248 | 10/1987 | Hosaka et al. ........................ | 323/300 |
| 4,954,948 | 9/1990 | Hira et al. ............................ | 364/231.6 |
| 5,193,189 | 3/1993 | Flood et al. ........................ | 364/140.01 |
| 5,331,560 | 7/1994 | Tamura ................................. | 701/115 |

FOREIGN PATENT DOCUMENTS

| | | |
|---|---|---|
| 0017219A2 | 10/1980 | European Pat. Off. . |
| 0608456A1 | 8/1994 | European Pat. Off. . |
| 3223678C2 | 10/1991 | Germany . |
| 2184570A | 6/1987 | United Kingdom . |

OTHER PUBLICATIONS

"Datenverabeitung im Realzeitbetrieb", Gräf et al., R. Oldenbourg Verlag, München–Wien, 1970, pp. 156–162.

*Primary Examiner*—Willis R. Wolfe
*Assistant Examiner*—Hieu T. Vo
*Attorney, Agent, or Firm*—Herbert L. Lerner; Laurence A. Greenberg

[57] ABSTRACT

In a method and a device for controlling an actuator, synchronous, cylinder-dependent and asynchronous operations are entered into lists by an operating system as a function of states, in particular operating states of an engine. The lists have prescribed priority levels according to which the lists are processed. In this way, quicker and more flexible processing of the operations is made possible.

13 Claims, 3 Drawing Sheets

50 TABLE 51  52  53

| OPERATIONS | PRIORITY LEVEL | CONDITION |
|---|---|---|
| CONTROL UNIT STATE | PRIORITY LEVEL 1 | SYNCHRONOUS ENGINE OPERATION |
| | PRIORITY LEVEL 2 | "ENGINE STATIONARY" |
| ROTATIONAL SPEED LIMITATION | PRIORITY LEVEL 1 | FUNCTION ACTIVE |
| | PRIORITY LEVEL 2 | FUNCTION NOT YET ACTIVE |
| SPEED LIMITATION | PRIORITY LEVEL 2 | FUNCTION ACTIVE |
| | PRIORITY LEVEL 3 | FUNCTION NOT YET ACTIVE |
| IDLING CONTROL | PRIORITY LEVEL 1 | ROTATIONAL SPEED NEAR TO IDLING |
| | PRIORITY LEVEL 2 | ROTATIONAL SPEED NOT NEAR TO IDLING |

FIG.6

50 TABLE

| OPERATIONS 51 | PRIORITY LEVEL 52 | CONDITION 53 |
|---|---|---|
| CONTROL UNIT STATE | PRIORITY LEVEL 1 | SYNCHRONOUS ENGINE OPERATION |
| | PRIORITY LEVEL 2 | "ENGINE STATIONARY" |
| ROTATIONAL SPEED LIMITATION | PRIORITY LEVEL 1 | FUNCTION ACTIVE |
| | PRIORITY LEVEL 2 | FUNCTION NOT YET ACTIVE |
| SPEED LIMITATION | PRIORITY LEVEL 2 | FUNCTION ACTIVE |
| | PRIORITY LEVEL 3 | FUNCTION NOT YET ACTIVE |
| IDLING CONTROL | PRIORITY LEVEL 1 | ROTATIONAL SPEED NEAR TO IDLING |
| | PRIORITY LEVEL 2 | ROTATIONAL SPEED NOT NEAR TO IDLING |

METHOD AND DEVICE FOR CONTROLLING AN ACTUATOR

CROSS-REFERENCE TO RELATED APPLICATION

This application is a Continuation of International Application Ser. No. PCT/DE96/01314, filed Jul. 18, 1996.

BACKGROUND OF THE INVENTION

Field of the Invention

The invention relates to a method for controlling an actuator, in particular for a motor vehicle, which includes detecting an input signal and generating a control signal for the actuator therefrom, ordering an operation into a prescribed priority level and processing the operation in accordance with the priority level. The invention also relates to a device for controlling an actuator, in particular for a motor vehicle, having an arithmetic unit which detects input signals and generates control signals for the actuator therefrom, the arithmetic unit ordering operations into prescribed priority levels and processing the operations in accordance with the priority level. The device and the method are used, for example, in a motor vehicle for controlling an engine.

Published European Patent Application 0 608 456 A1 has already described a method and a device for controlling an actuator as described above. The device has an arithmetic unit with an operating system which holds ready time management procedures that enter synchronous operations and asynchronous operations into a synchronous list or an asynchronous list, the synchronous list having priority over the asynchronous list during processing. In that context synchronous operations are understood to be operations which are triggered as a function of a crank angle. Asynchronous operations are understood to include operations which are not directly dependent on a crank angle. The synchronous operations are always entered into the synchronous list and the asynchronous operations are always entered into the asynchronous list, so that the synchronous operations always have a higher priority than the asynchronous operations during processing, irrespective of operating states of the engine.

SUMMARY OF THE INVENTION

It is accordingly an object of the invention to provide a method and a device for controlling an actuator, which overcome the hereinafore-mentioned disadvantages of the heretofore-known methods and devices of this general type, which shorten the time for processing various operations, such as synchronous and asynchronous procedures, for example, and which additionally achieve more flexible and more efficient utilization of an available processing capacity of an arithmetic unit. With the foregoing and other objects in view there is provided, in accordance with the invention, a method for controlling an actuator, in particular for a motor vehicle, which comprises detecting an input signal; generating a control signal for an actuator from the input signal; ordering an operation into a prescribed priority level; processing the operation in accordance with the priority level; and assigning the operation to different priority levels as a function of at least one state, in particular an operating state of a motor vehicle.

With the objects of the invention in view there is also provided a device for controlling an actuator, in particular for a motor vehicle, comprising an arithmetic unit detecting input signals and generating control signals for an actuator from the input signals, the arithmetic unit ordering operations into prescribed priority levels and processing the operations in accordance with the priority level, and the arithmetic unit assigning the operations to different priority levels as a function of states, in particular of operating states of a motor vehicle.

The inventive method and the inventive device have the advantage of assigning the operations to different priority levels as a function of input signals which constitute, for example, operating states of an engine or other states. In this way, a suitable allocation of priority levels for each operating state is achieved and thus efficient processing of the operations is made possible.

In accordance with another feature of the invention, the operations are entered into various lists which have different priority levels with regard to processing. In this way, simple management of the operations is made possible.

In accordance with a further feature of the invention, the execution of the assignment of a synchronous operation to a priority level has priority.

In accordance with an added feature of the invention, cylinder-dependent operations are assigned to a priority level after the assignment of the synchronous operations. In addition, it is advantageous that asynchronous operations are not assigned to a priority level until after the cylinder-dependent operations.

The sequence of the assignment of operations to priority levels leads to the processing of the assignment being adapted to instantaneous variables such as operating states of the engine, for example.

The fact that all of the operations which are entered in a list with a higher priority level are processed before the processing of the operations of a list with a lower priority level, ensures that the operations which have a higher priority level at a given time, and are thus more important, are processed promptly.

In accordance with a concomitant feature of the invention, there is provided a ring buffer which is constructed as a first-in first-out (FIFO) memory and in which a list is stored.

Other features which are considered as characteristic for the invention are set forth in the appended claims.

Although the invention is illustrated and described herein as embodied in a method and a device for controlling an actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a view of an assignment.

DESCRIPTION OF THE PREFERRED EMBODIMENTS

Figure 1:
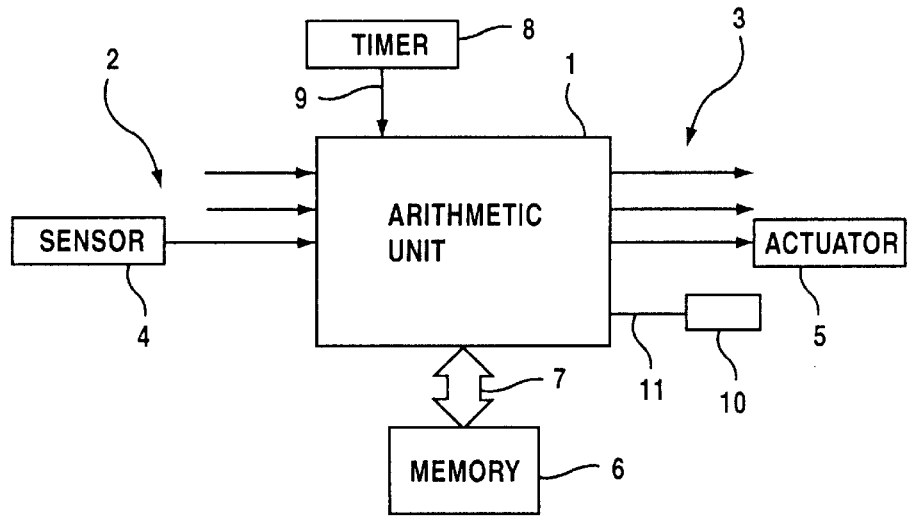
FIG. 1 is a block circuit diagram of a device for generating control signals.

Referring now to the figures of the drawings in detail and first, particularly, to FIG. 1 thereof, there is seen an arithmetic unit 1 to which input lines 2 are led. A sensor 4 is connected through one of the input lines 2 to the arithmetic unit 1. The arithmetic unit 1 has output lines 3. An actuator 5 is connected through one of the output lines 3 to the arithmetic unit 1. Furthermore, the arithmetic unit 1 is connected through a data line 7 to a memory 6. A timer 8 is connected through a control line 9 to the arithmetic unit 1. In FIG. 1, only one sensor 4 and one actuator 5 are illustrated explicitly. However, a plurality of sensors and/or actuators and/or switches, which are not illustrated explicitly, are connected through the input lines 2 and through the output lines 3 to the arithmetic unit 1.

The arithmetic unit 1 detects measurement signals of the sensor 4, processes or evaluates the measurement signals of the sensor 4, determines control signals from the measurement signals of the sensor 4 and passes the control signals on to the actuator 5. The sensor 4 constitutes, for example, a rotational speed and reference mark sensor which uses a sensor gearwheel to determine whether or not the engine is turning and/or what crank angle a crank shaft assumes. This information is detected by the arithmetic unit 1, further processed, and from it a control signal is determined for the actuator 5 which, for example, drives an injection valve. However, the sensor 5 can also detect other states of the vehicle.

Operations which are used for the detection and evaluation of the measurement signals and for the determination of the control signals, are managed by an operating system. The operations and the operating system are stored in the memory 6.

Figure 2:
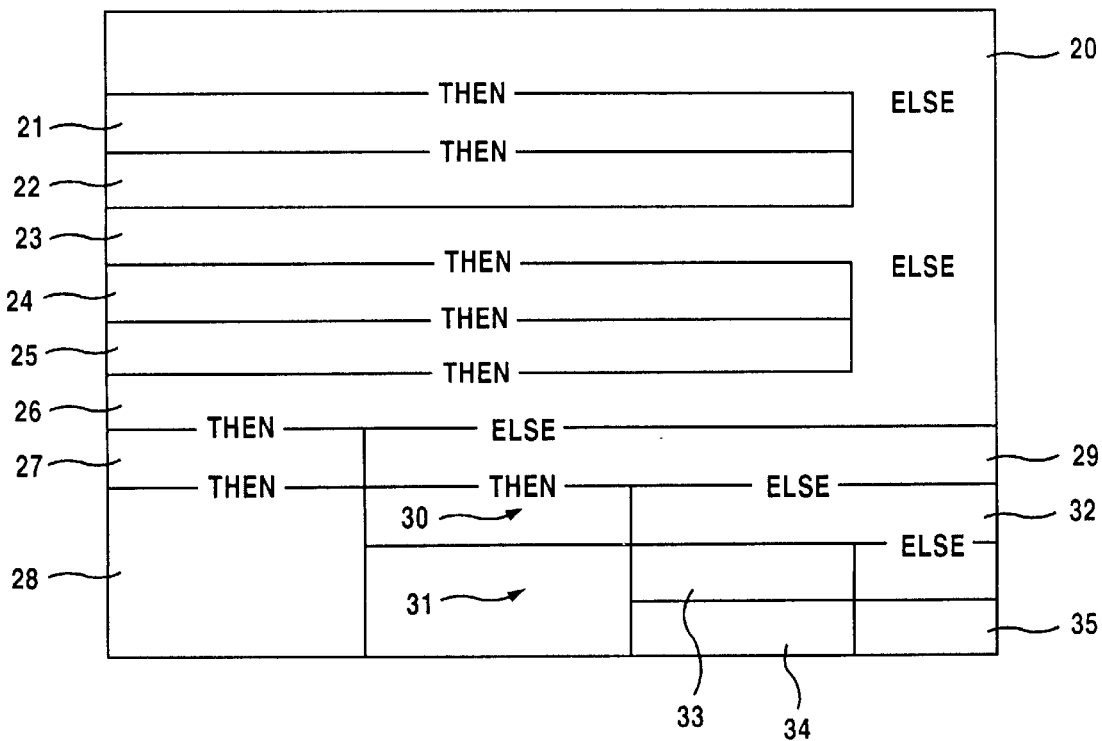
FIG. 2 is a schematic view of a program sequence.

FIG. 2 shows a schematic view of a sequence of operations, i.e. a structure of the operating system. At a program item 20, the arithmetic unit 1 checks whether or not a segment joint, i.e. a prescribed angular position of the crank shaft, such as 120° for example, has been determined by the rotational speed and reference mark sensor 4. If this is the case, the program branches to a program item 21. At the program item 21, a management program is called up which enters synchronous operations into one of three lists 40, 41, 42 as a function of a prescribed crank angle of 120°. Three lists 40, 41, 42 are used in this exemplary embodiment. However, this does not mean a restriction on the number of lists. Depending on the application, two or more than three lists may also be used. The synchronous operations execute a specific function, such as the control of the injection or the control of the ignition for example, as a function of a crank angle of the crank shaft. The synchronous operations must be executed in synchronism with a prescribed crank angle.

The three lists have different priority levels with regard to processing. The first list 40 has the highest priority level, the second list 41 has a medium priority level and the third list 42 has the lowest priority level. The lists are stored in the memory 6. A table in the memory 6 stores which operations relating to which crank angles are entered into which list as a function of which operating states.

If the synchronous operations for the crank angle of 120° are entered, cylinder-specific operations are then entered into a list 40, 41, 42 with an appropriate priority level at a program item 22 as a function of operating variables of the motor vehicle or of the engine. The conditions under which cylinder-specific operations are entered into which list 40, 41, 42 are likewise stored in a table in the memory 6, as in the case of the synchronous operations.

If all of the cylinder-specific operations are entered into a list 40, 41, 42 for the crank angle of 120° as a function of the table which is stored in the memory 6, the program branches to a program item 23.

However, if no segment joint is present at the program item 20, the program branches directly to the program item 23.

At the program item 23, the arithmetic unit 1 checks whether or not a timing pulse is emitted by the timer 8. These timing pulses are emitted every 10 ms by the timer 8. The timing pulses can also be emitted at other chronological intervals depending on requirements. If the result of the interrogation at the program item 23 is that a timing pulse has been emitted, the program branches to a program item 24.

At the program item 24, the arithmetic unit 1 preferably checks whether or not a diagnostic signal is present on a prescribed input line 2. The diagnostic signal is emitted by an external diagnostic device which is connected to the prescribed input line 2. If this is the case, a diagnosis of the arithmetic unit 1 and/or of the sensors 4 or of the actuators 5 is executed. The diagnosis includes checking for the fault-free functioning of the arithmetic unit 1, of the sensor 4 and of the actuator 5.

Furthermore, faults which occur during the operation of the engine are interrogated through the use of the diagnosis in the memory 6 in which a fault field is stored. If there is no diagnostic signal present, the program branches immediately to a program item 25. The program item 24 is an advantageous additional function which is not always executed and the program branches directly from the program item 23 to program item 25 in these cases.

At the program item 25, a management program is called up which itself executes chronologically brief operations and enters asynchronous operations into one of the lists 40, 41, 42. The information regarding which asynchronous operation is entered into which list 40, 41, 42 is stored in a table in the memory 6. The entry of the asynchronous operations takes place as a function of states of the vehicle, in particular of operating states of the engine. Once the asynchronous operations have been entered into the lists 40, 41, 42 in accordance with the table of the memory 6, the program branches to a program item 26.

If a timing pulse from the timer 8 is present at the program item 23, the program branches directly to the program item 26.

The operations are written, with optimum priority, into an appropriate list for the conditions as a function of conditions which arise during the execution of the operations.

At the program item 26, the first list 40, which has the highest priority level during processing, is inspected to determine whether or not an operation has been entered. If this is the case, the program branches to a program item 27. At the program item 27, the operation at which a starting pointer is directed is processed, and then at a program item 28 the starting pointer is moved to the list location which is the next to be processed. The starting pointer always points to the operation which has been entered in the list for the longest time. The lists 40, 41, 42 are constructed as first-in first-out memories. Then, the program item 20 is branched back to and the program is run through again.

If the result of the interrogation at the program item 26 is that there is no operation entered in the first list 40, the program branches to a program item 29. At the program item 29, it is checked whether or not an operation has been entered in the second list 41 to which a lower priority level is assigned than to the first list 40. If this is the case, at a program item 30 the operation at which the starting pointer is directed is processed. Then, at a program item 31, the starting pointer is moved to the list location which is the next to be processed. Subsequently, the program item 20 is branched back to and the program is run through.

If the result of the interrogation at the program item 29 is that there is no operation entered in the second list 41, the program branches to a program item 32. At the program item 32, there is an interrogation to determine whether or not an operation has been entered in the third list 42 which has a lower priority level than the second list 41. If this is the case, at a program item 33 the operation at which the starting pointer is directed is carried out. Then, at a program item 34, the starting pointer is moved to the next list location. Finally, the program item 20 is branched back to and the program is run through again.

If the result of the interrogation at the program item 32 is that there is no operation entered in the third list 42, at a program item 35 a background program is executed without a prescribed time requirement, for example a fault diagnosis with the aid of test sums. After the fault diagnosis is executed, the program item 20 is branched back to and the program is run through again. The execution of the program item 35 constitutes an advantageous development which can be executed on an optional basis.

Figure 3:
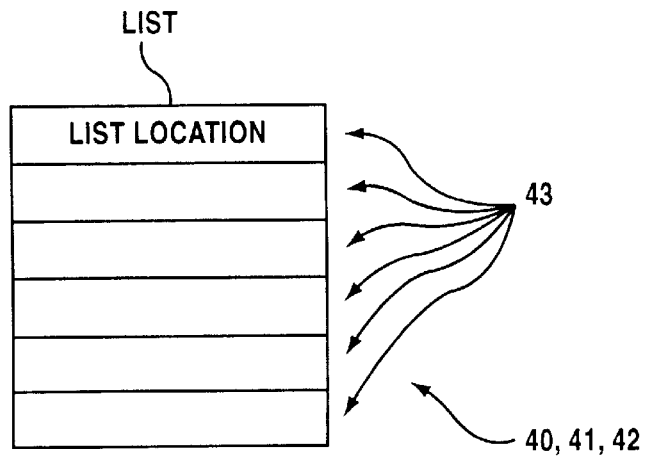
FIG. 3 is a view of a list.

FIG. 3 illustrates lists 40, 41, 42, namely the first, the second and the third lists 40, 41, 42. The lists 40, 41, 42 are stored in the memory 6. One list 40, 41, 42 has a plurality of list locations 43. In each case one operation which is to be processed is entered into one list location 43. The first, the second and the third lists 40, 41, 42 are of identical structure but differ in the priority with which the lists are processed in accordance with the program in FIG. 2.

Figure 4:
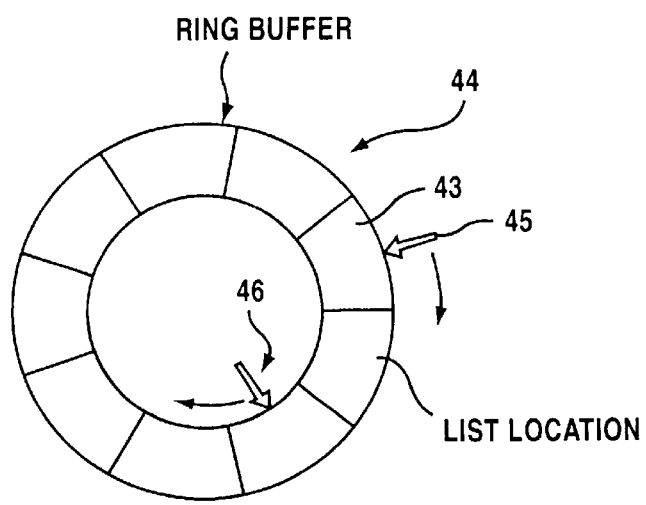
FIG. 4 is a view of a ring buffer.

A particularly advantageous embodiment of the first list 40, of the second list 41 and of the third list 42 is shown by FIG. 4 in the form of a ring buffer 44. The ring buffer 44 is constructed as a first-in first-out memory, i.e. the operation which is first entered is also processed first. A starting pointer 45 points to an operation or a list location 43 which has been occupied by an operation in the ring buffer 44 for the longest time, i.e. it points to that operation which has been stored in the ring buffer 44 for the longest time. When the operations of a list 40, 41, 42 are being processed, that operation to which the starting pointer 45 is pointing is processed. After the operation has been processed, the starting pointer 45 is moved to the next list location 43 which has the operation that is the next in the list to be processed.

The synchronous, the cylinder-specific and the asynchronous operations are entered into one of the lists 40, 41, 42, in each case into that list location 43 to which an end pointer 46 points. After the operation has been entered, the end pointer 46 is moved to the next free list field. The direction in which the starting pointer 45 is moved after a program sequence has been processed, is illustrated in FIG. 4 in the form of an arrow. After an operation has been entered, the end pointer 46 is moved on in the clockwise direction by one list location, so that the end pointer 46 again points to a new list location 43.

If the end pointer 46 and the starting pointer 45 are at the same list field, there is no operation entered into the list 40, 41, 42. If the starting pointer 45 is one list location further on than the end pointer 46, as viewed in the clockwise direction, the list 40, 41, 42 is completely filled.

In one advantageous development, it is additionally checked during the entry of an operation whether or not the entry causes the ring buffer 44 to overflow, i.e. whether the starting pointer 45 is at the same list location 43 as the end pointer 46 after the entry. If this is the case, an error bit is set. In this way, it is possible to detect an overloading of the ring buffer 44. Configuring the lists 40, 41, 42 in the form of a ring buffer ensures, even in the case of the ring buffer 44 overflowing, that all of the operations stored in the ring buffer 44 continue to be processed and only a small number of operations are lost when the overflow occurs. In this way it is ensured that most operations can be processed even in the case of overloading.

Figure 5:
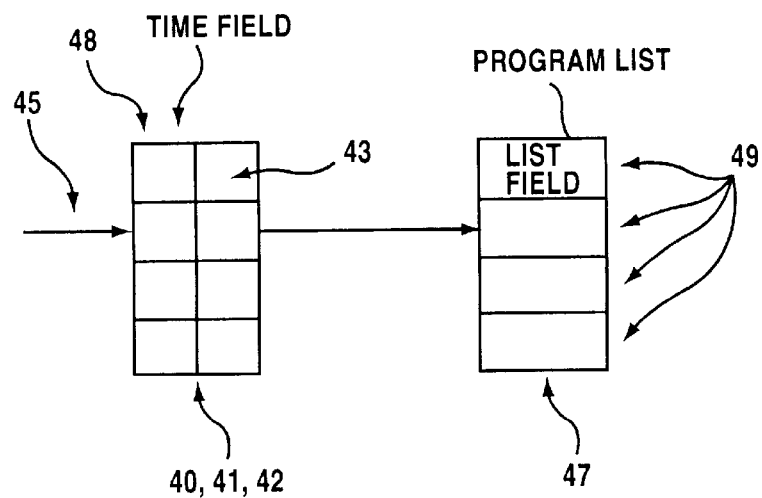
FIG. 5 is a view of a second program sequence.

FIG. 5 shows an advantageous development of the invention which resides in storing a list field 49 of a program list 47 in a list 40, 41, 42. The program list 47 has a plurality of list fields 49 at which one memory address is stored in each case. The memory address points to an operation which is stored in the memory 6. The advantage which this provides is that, for an entry of an operation, it is not necessary to enter the entire operation into a list 40, 41, 42 but rather only its list field 49 is entered into the list 40, 41, 42.

A particularly advantageous development of the invention is to store a time field 48 for each operation in a first, second or third list 40, 41, 42. The time field 48 contains a variable or fixed time value, through the use of which the start of the operation is detected. The time value being used is, for example, an integer which is decreased by one integer, for example by one, whenever it is checked whether or not the operation is to be started. Once the time value reaches the value 0, the operation is started. The checking as to whether or not the operation is to be started takes place according to a prescribed timing pattern. In the exemplary embodiment described herein, a checked is performed every 10 ms as to whether or not the operation is to be started, and the time value, which has the value 3 for example, is decreased by the value 1 until the time value reaches the value 0 and the operation is started.

Three timing patterns 10 ms, 100 ms and 1 s are advantageously prescribed. Each timing pattern is assigned at least a first and/or second and/or third list 40, 41, 42. In the 10 ms timing pattern, the operations are checked every 10 ms for a start and the time value is decreased by one integer. In the 100 ms timing pattern, the operations are checked every 100 ms for a start and the time value is decreased by one integer. In the 1 s timing pattern, the operations are checked every second for a start and the time value is decreased by one value every second. In this way, it is possible to check every 10 ms the operations which have to be checked often, to check every 100 ms the operations which do not have to be checked so often, and every second the operations which rarely have to be checked.

It is also possible to use timing patterns with other times and/or more or fewer timing patterns and even to increase the time value by the value 1 whenever the operation is checked until a prescribed value is reached and the operation is subsequently started.

The time value can be adapted to operating conditions or other states of the vehicle or of the engine while the program is running, by virtue of the fact that the time value can be freely selected. In this way, flexible processing of the operation is achieved.

A particular advantage of the time value is that a separate time value, which is independent of the absolute time of the operating system, is available for each operation. This ensures that each operation which is entered in a list is processed even if, for example because of overloading of the system, checking of the operation in accordance with a prescribed time pattern is missed once and the operation is not checked until the next timing pattern. The operation is thus planned for all cases even if it takes place one timing pattern too late.

FIG. 6 shows a table 50 which assigns operations to lists 40, 41, 42 with various priority levels, as a function of operating states of the engine, of the vehicle or of further states.

The operations are given in a column 51. A column 52 contains the priority levels to which the operations are assigned. In this context, the highest priority level 1 corresponds to the first list 40, the second highest priority level 2 to the second list 41 and the lowest priority level 3 to the third list 42.

Examples of the conditions on which the operations are assigned to different priority levels, and thus entered in various lists 40, 41, 42, are given in a column 53.

An operation which is designated by control unit state is assigned to the priority level 2 when the engine is stationary or to the priority level 1 when the engine is operating synchronously.

An operation which is designated by a rotational speed limitation and has the task of limiting the rotational speed of the engine is allocated to the priority level 1 when the rotational speed limitation is being executed and to the priority level 2 when the rotational speed limitation is not active, i.e. when the rotational speed lies a prescribed value below a prescribed limit rotational speed.

The idling control operation, which controls the idling speed, is assigned to various priority levels as a function of the rotational speed and is therefore entered into various lists 40, 41, 42. Given a rotational speed which is in the region of 100 revolutions per minute (rpm) in the region of the prescribed rotational speed of 800 rpm, the idling control is assigned the highest priority level 1. If the rotational speed lies outside, the idling control is assigned to the second highest priority level 2.

The speed limitation operation, which controls the speed of the vehicle, is assigned to the second highest priority level 2 when the speed limitation is active, and is assigned to the lowest priority level 3 when the speed limitation is not active, i.e. the speed of the vehicle lies a prescribed value below a prescribed limit speed.

The term "list 40, 41, 42" is to be understood to mean program memories 40, 41, 42. Likewise, asynchronous list, synchronous list and table are to be understood as memory areas.

We claim:

1. A device for controlling an actuator, comprising:
    an arithmetic unit detecting input signals and generating control signals for the actuator, said control signals containing control operations for the actuator derived from the input signals, said arithmetic unit ordering said control operations into prescribed priority levels, assigning said control operations to different priority levels as a function of the input signal, processing said control operations in accordance with said priority levels, and transmitting said control signals to the actuator.

2. The device according to claim 1, including a ring buffer constructed as a first-in first-out memory connected to said arithmetic unit.

3. The device according to claim 1, including ring buffers constructed as first-in first-out memories connected to said arithmetic unit, said ring buffers constituting program memories, said program memories containing control operations, and each program memory being assigned to one of a plurality of priority levels according to which said program memories are processed.

4. A device for controlling an actuator for a motor vehicle, comprising:
    an arithmetic unit detecting input signals from a motor vehicle and generating control signals containing control operations for an actuator derived from the input signals, said arithmetic unit ordering said control operations into prescribed priority levels, assigning said control operations to different priority levels as a function of operating states of the motor vehicle, processing said control operations in accordance with said priority levels, and transmitting said control signals to the actuator.

5. A method for controlling an actuator, which comprises:
    detecting an input signal from a device associated with an actuator;
    ordering a control operation for an actuator into one of a prescribed set of priority levels;
    assigning the control operation to different priority levels within the prescribed set of priority levels as a function of the input signal;
    processing the control operation in accordance with the one prescribed priority level;
    generating a control signal for the actuator, the control signal containing the control operation; and
    transmitting the control signal to the actuator.

6. The method according to claim 5, which comprises assigning each control operation to one of a plurality of program memories with different priority levels, entering the control operation into successive memory locations in sequence therein, and executing the control operations in accordance with their sequence in the program memories starting with the program memory having the highest priority level.

7. The method according to claim 6, which comprises classifying a control operation into one of a prescribed set of priority levels by entering an address of a list field into the program memory, pointing the address to the list field of a program list, storing a memory address, at which the control operation is stored, in the list field of the program list, and storing the program list in a memory.

8. The method according to claim 6, which comprises providing a time field in the program memory for a control operation by entering a time value into the time field, decreasing or increasing the time value by a prescribed value in accordance with a prescribed timing pattern, and starting the control operation when the time value reaches the prescribed value.

9. The method according to claim 8, which comprises using a variable value which is modified as a function of the input signal representing at least one operating state of a motor vehicle, as the time value.

10. The method according to claim 5, which comprises initially assigning synchronous control operations to one of a prescribed set of priority levels, and then assigning asynchronous control operations to one of a prescribed set of priority levels.

11. The method according to claim 5, which comprises assigning each of the control operations to one of a prescribed set of priority levels as a function of at least one operating state of the device, and storing the control operations, the priority levels assigned to each control operation and the at least one operating state of the device in a table.

12. A method for controlling an actuator for a motor vehicle, which comprises:

detecting an input signal from a motor vehicle;

ordering a control operation for an actuator into one of a prescribed set of priority levels;

assigning the control operation to different priority levels within the prescribed set of priority levels as a function of at least one operating state of the motor vehicle;

processing the control operation in accordance with the one prescribed priority level;

generating a control signal for the actuator, the control signal containing the control operation; and transmitting the control signal to the actuator.

13. The method according to claim 12, which comprises initially assigning synchronous control operations to one of a prescribed set of priority levels, subsequently assigning cylinder-dependent control operations to one of a prescribed set of priority levels, and then assigning asynchronous control operations to one of a prescribed set of priority levels.

* * * * *

UNITED STATES PATENT AND TRADEMARK OFFICE
CERTIFICATE OF CORRECTION

PATENT NO : 5,951,619
DATED : September 14, 1999
INVENTOR(S) : Richard Merl et al.

It is certified that error appears in the above-identified patent and that said Letters Patent is hereby corrected as shown below:

ON THE TITLE PAGE:

Item [30] should be inserted as follows:

July 27, 1995     [DE]     Germany ..... 195 27 541.1

Signed and Sealed this

Second Day of January, 2001

Attest:

*Attesting Officer*

Q. TODD DICKINSON
*Commissioner of Patents and Trademarks*